US005626017A

United States Patent [19]

Sattelmayer

[11] Patent Number: 5,626,017

[45] Date of Patent: May 6, 1997

[54] COMBUSTION CHAMBER FOR GAS TURBINE ENGINE

[75] Inventor: Thomas Sattelmayer, Mandach, Switzerland

[73] Assignee: ABB Research Ltd., Zurich, Switzerland

[21] Appl. No.: 449,752

[22] Filed: May 25, 1995

[30] Foreign Application Priority Data

Jul. 25, 1994 [DE] Germany ........................ 44 26 351.1

[51] Int. Cl.[6] .............................. F02C 3/14; F02C 7/00

[52] U.S. Cl. .............................................. 60/723; 60/737

[58] Field of Search .................................. 60/39.06, 723, 60/733, 737, 746, 749

[56] References Cited

U.S. PATENT DOCUMENTS

| | | | |
|---|---|---|---|
| 4,731,989 | 3/1988 | Furuya et al. | 60/723 |
| 5,339,634 | 8/1994 | Gale et al. | 60/723 |
| 5,452,574 | 9/1995 | Cowell et al. | 60/723 |

FOREIGN PATENT DOCUMENTS

| | | |
|---|---|---|
| 0320746 | 6/1989 | European Pat. Off. . |
| 0321809 | 6/1989 | European Pat. Off. . |
| 4202018C1 | 4/1993 | Germany . |
| 1577256 | 10/1980 | United Kingdom . |

OTHER PUBLICATIONS

"Mixed Combustion Device", Patent Abstracts of Japan, No. 4-190016, Jul. 8, 1992, M-1329, Oct. 23, 1992, vol. 16, No. 515.

*Primary Examiner*—Louis J. Casaregola
*Attorney, Agent, or Firm*—Burns, Doane, Swecker & Mathis, L.L.P.

[57] ABSTRACT

In a combustion chamber consisting of a first stage (1) and a second stage (2) arranged downstream in the direction of flow, a mixer (100) is arranged on the head side of the first stage (1), which mixer (100) forms a fuel/air mixture (19). Acting on the outflow side of this mixer (100) is a catalyzer (3) in which the said mixture (19) is completely burnt, the mixing being selected in such a way that an adiabatic flame temperature of between 800° and 1100° C. arises. Positioned on the outflow side of this catalyzer (3) are vortex generators (200) which provide for a turbulent flow. Downstream of these vortex generators (200), fuel (9) is injected and self-ignition initiated. A following jump (12) in cross section in the cross section of flow of the combustion chamber, which jump (12) in cross section forms the start of the second stage (2), provides a stabilizing backflow zone of the flame front (21).

15 Claims, 6 Drawing Sheets

FIG. 10
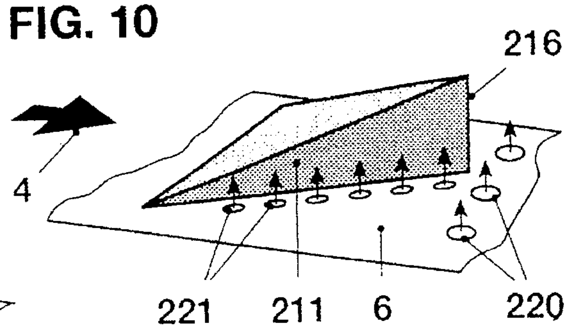
FIG. 11
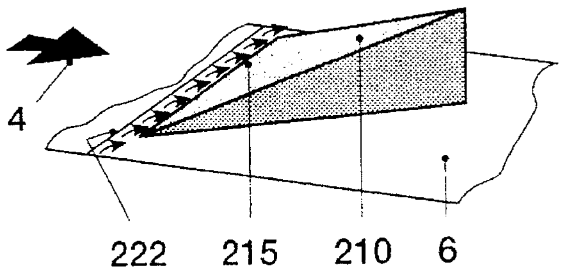
FIG. 12
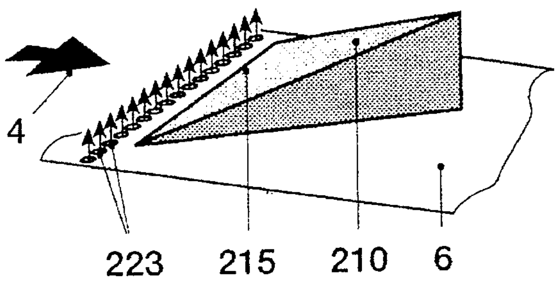
FIG. 13
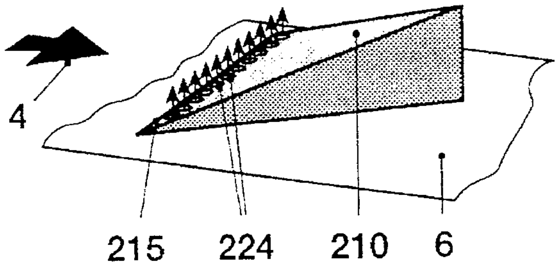
FIG. 14
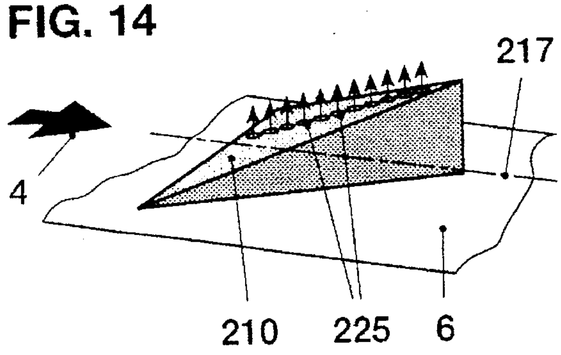
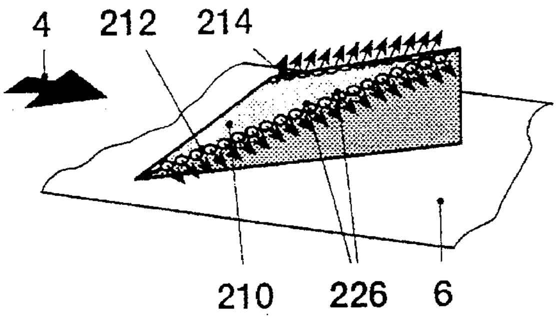
FIG. 15
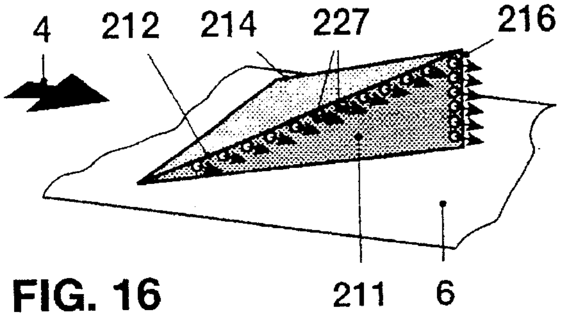
FIG. 16

COMBUSTION CHAMBER FOR GAS TURBINE ENGINE

FIELD OF THE INVENTION

The present invention relates to a two stage combustion chamber.

DISCUSSION OF THE BACKGROUND

In combustion chambers having a wide load range, the problem exists of how the combustion can be operated at a high efficiency with a low pollutants emission. Here, although it is mostly the NOx emissions which are to the fore, it has in the meantime become apparent that the UHC (=unsaturated hydrocarbons) and the CO emissions will also have to be greatly minimized in the future. Especially when it is a matter of using liquid and/or gaseous fuels, it is very quickly found that the design for one type of fuel, for example for oil, and directed toward the minimization of a pollutant emission, for example the NOx emissions, cannot be satisfactorily transferred to other operational types and other pollutant emissions. In multi-stage combustion chambers it is attempted to run the second stage with a lean mixture. However, this is only possible if this second stage always has a constant temperature at the inlet, so that sufficient burn-up in the second stage can also be achieved at a low fuel quantity, i.e. the mixing in the first stage ought to be kept largely constant, which is not possible, for example, with the known diffusion burners. As far as can be gathered, the prior art does not include such a combustion chamber.

SUMMARY OF THE INVENTION

Accordingly, one object of the invention as defined in the claims is to provide a novel combustion chamber of the type mentioned at the beginning and to minimize all pollutant emissions occurring during combustion, irrespective of which type of fuel is used.

Basically, it is matter of keeping the mixing in the first stage constant; thus the UHC and CO emissions can be prevented. The mixer used for the first stage therefore mixes fuel and air uniformly, droplet evaporation taking place in the case of oil. If a premixing burner according to U.S. Pat. No. 4,932,861 to Keller et al. is used for the said mixing, the latter undergoes a modification concerning the aerodynamics, which modification manifests itself in the fact that the swirl is substantially reduced. This is done by 20–100% wider air-inlet slots, or by an increase in the number of these slots. The novel premixing burner is therefore distinguished by the fact that it can used alone as mixer and can no longer produce any backflow zones. Acting downstream of this mixer is a catalyzer in which the fuel/air mixture is completely burnt. The mixture is selected in such a way that typical adiabatic flame temperatures of between 800° and 1100° C. are reached and thus the thermal destruction of the catalyzer is impossible. Compared with other catalytic methods for high temperatures, this is of great advantage. On account of the low temperatures, no homogeneous gasphase reaction occurs, but only a reaction at the active surfaces. The NOx production of such a chemical transformation is very low, very much smaller than 1 ppmv. A largely NOx-free hot gas is available at the end of the catalyzer.

After the discharge from the catalyzer, the flow is accelerated to about 80–120 m/s. Vortex generators provide for a turbulent flow in order to intermix the fuel injected downstream as quickly as possible. At the same time, the constant temperature at the inlet of the second stage provides for reliable self-ignition of the mixture, irrespective of the fuel quantity injected into the second stage. Here, too, it is found that the injection of the fuel into a hot gas produces only a very small amount of NOx.

A further essential advantage of the invention can be seen in the fact that the output control over the gas-turbine load can essentially be effected by the adaptation of the fuel quantity in the second stage.

Advantageous and convenient further developments of the achievement of the object according to the invention are defined in the further dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 10–16 show variants of the fuel feed in connection with vortex generators.

DESCRIPTION OF THE PREFERRED EMBODIMENTS

Figure 1:
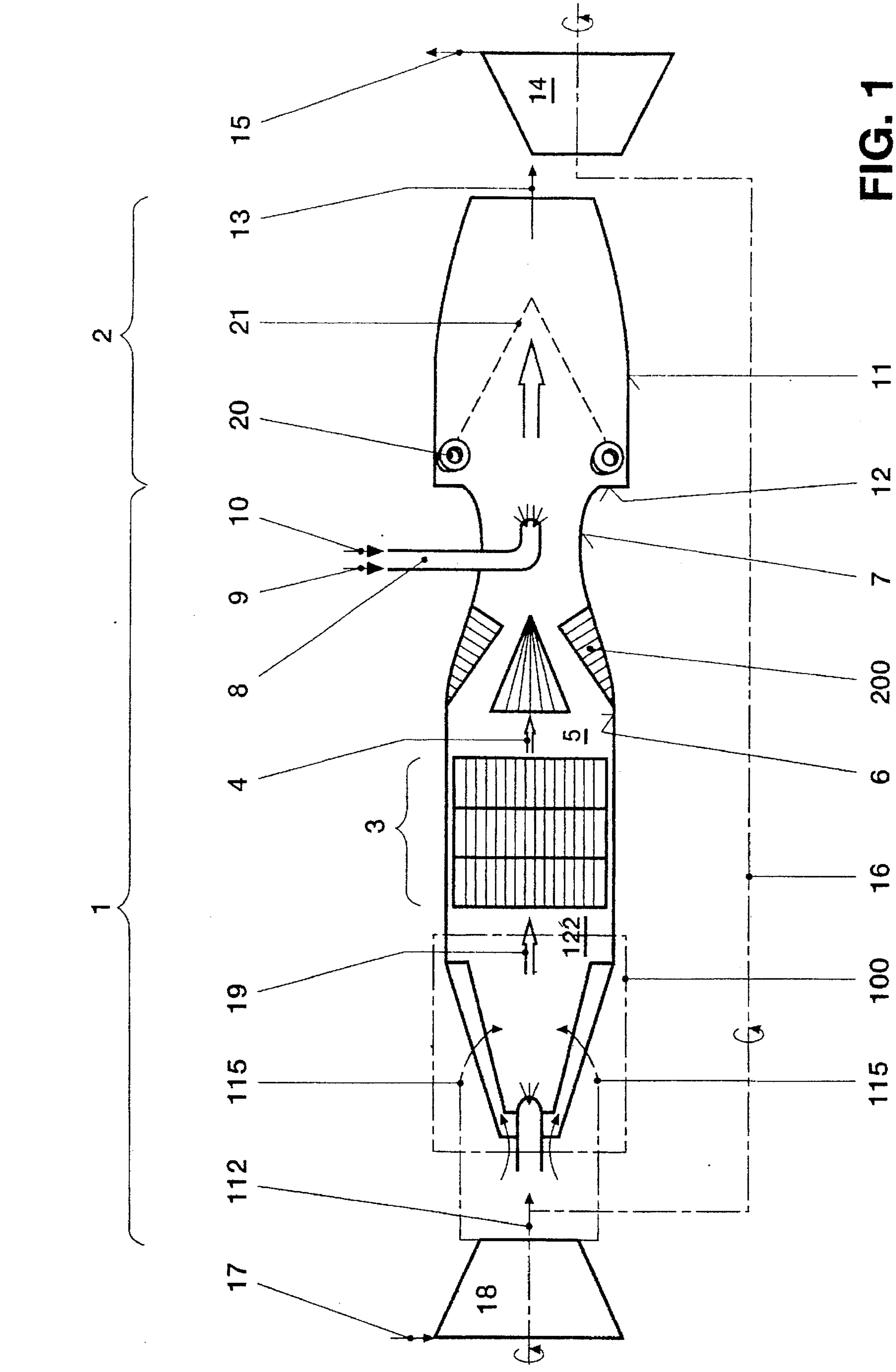
FIG. 1 shows a combustion chamber, conceived as an annular combustion chamber, arranged between a compressor and a turbine.

Referring now to the drawings, wherein the reference numerals designate identical or corresponding parts throughout the several views, all elements required for directly understanding the invention have been omitted, and the direction of flow of the media is indicated by arrows, in FIG. 1 an annular combustion chamber is shown, as apparent from the shaft axis 16, which essentially has the form of a continuous, annular or quasi-annular cylinder. In addition, such a combustion chamber can also consist of a number of axially, quasi-axially or helically arranged and individually self-contained combustion spaces. The combustion chambers per se can also consist of a single tube. The annular combustion chamber according to FIG. 1 comprises a first stage 1 and a second stage 2 which are connected one after the other, the second stage 2 consisting of the actual combustion zone 11. In the direction of flow, the first stage 1 first of all comprises a number of mixers 100 arranged in the peripheral direction, the mixer itself being derived essentially from the burner according to U.S. Pat. No. 4,932,861 to Keller et al. The following description of the combustion chamber is directed solely toward the one section plane according to FIG. 1. All components of the combustion chamber are of course arranged in appropriate number in the peripheral direction. Acting upstream of this mixer 100 is a compressor 18 in which the drawn-in air 17 is compressed. The air 115 then delivered by the compressor has a pressure of 10–40 bar at a temperature of 300–600° C. This air 115 flows into the mixer 100, the mode of operation of which is described in more detail with reference to FIGS. 2–5. After a short transition piece 122 downstream of the mixer 100, the fuel/air mixture 19 prepared in the mixer 100 reaches a catalyzer 3 in which this mixture 19 is completely burnt. Here, the mixture 19 is selected in such a way that typical adiabatic flame temperatures between 800° and 1050° C. are reached, whereby the thermal destruction of the catalyzer 3 is impossible. On account of the relatively low temperature, no homogeneous gas-phase reaction takes place but only a reaction at the active surfaces of the catalyzer 3. The NOx production of such a chemical transformation is very low, very much smaller than 1 ppmv. A largely NOx-free hot gas 4 is therefore available at the end of the catalyzer 3. The catalyzer 3 itself comprises a first very active stage which initiates the fuel transformation. A palladium oxide is preferably used here as the material. The next stages of the catalyzer 3 can be made of other materials, for example platinum. The fuel is thus largely transformed in the catalyzer 3, the flow velocity in the catalyzer 3 being less than about 30 m/s. After the discharge from the catalyzer 3, the hot gases 4 flow into an inflow zone 5 and are accelerated to about 80–120 m/s. The inflow zone 5 is equipped on the inside and in the peripheral direction of the duct wall 6 with a number of vortex-generating elements 200, simply called vortex generators below, which will be discussed in more detail further below. The hot gases 4 are swirled by the vortex generators 200 in such a way that recirculation areas can no longer occur in the wake of the said vortex generators 200 in the following premixing section 7. A plurality of fuel lances 8 are disposed in the peripheral direction of this premixing section 7 designed as a venturi duct, which fuel lances assume the function of feeding a fuel 9 and assisting air 10. These media can be fed to the individual fuel lances 8, for example, via a ring main (not shown). The swirl flow initiated by the vortex generators 200 provides for extensive distribution of the fuel 9 introduced, and also of the admixed assisting air 10 if need be. Furthermore, the swirl flow provides for homogenization of the mixture of combustion air and fuel. The fuel 9 injected by the fuel lance 8 into the hot gases 4 initiates self-ignition provided these hot gases 4 have that specific temperature which is capable of initiating the fuel-dependent self-ignition. If the annular combustion chamber is operated with a gaseous fuel, the hot gases 4 must be at a temperature greater than 800° C., which is also present here, for initiating self-ignition. As already appreciated above, there is the potential risk of flashback during such combustion. This problem is removed on the one hand by designing the premixing zone 7 as a venturi duct and on the other hand by the injection of the fuel 9 being disposed in the region of the greatest reduction in area in the premixing zone 7. Due to the narrowing in the premixing zone 7, the turbulence is reduced by the increase in the axial velocity, which minimizes the risk of flashback by the reduction in the turbulent flame speed. On the other hand, the extensive distribution of the fuel 9 will still be guaranteed, since the peripheral component of the swirl flow originating from the vortex generators 200 is not impaired. The combustion zone 11 follows behind the premixing zone 7, which is kept relatively short. The transition between the two zones is formed by a radial jump 12 in cross section, which first of all induces the cross section of flow of the combustion zone 11. A flame front 21 also appears in the plane of the jump 12 in cross section. In order to avoid flashback of the flame into the interior of the premixing zone 7, the flame front 21 must be kept stable. For this purpose, the vortex generators 200 are designed in such a way that still no recirculation takes place in the premixing zone 7; only after the sudden widening of the cross section does the breakdown of the swirl flow take place. The swirl flow helps to quickly re-establish the flow behind the jump 12 in cross section so that effective burn-up at short overall length can be achieved by as far as possible complete utilization of the volume of the combustion zone 11. A marginal flow zone forms inside this jump 12 in cross section during operation, in which marginal flow zone vortex separations occur due to the vacuum prevailing there, which vortex separations then lead to stabilization of the flame front. These corner vortices 20 also form the ignition zones inside the second stage 2. The hot working gases 13 prepared in the combustion zone 11 then act on a turbine 14 acting downstream. The exhaust gases 15 can then be used to operate a steam circuit, the circuit arrangement in the last-mentioned case then being a combined system.

In summary it can be said that starting of the afterburning in the flow duct is impossible on account of the high flow velocity. During combustion of oil, direct ignition can be prevented by addition of water. As already mentioned, the jump 12 in cross section serves to stabilize the afterburning. The self-ignition of the mixture is effected in the corner vortices 20 on account of the long dwell time. The flame front 21 advances toward the center of the combustion zone 11. The CO burn-up is also complete just downstream of the merging point of both flame-front portions. Typical combustion temperatures are 1300°–1600° C. The method of injecting fuel into a hot gas is predestined to produce only a small amount of NOx.

The proposed method also has a very good behavior with regard to a wide load range. Since the mixing in the first stage 1 is always kept largely constant, the UHC or CO emissions can also be prevented. The constant temperature at the inlet to the second stage 2 ensures reliable self-ignition of the mixture, irrespective of the fuel quantity in the second stage 2. Furthermore, the inlet temperature is high enough in order to obtain sufficient burn-up in the second stage 2 even at a low fuel quantity. The output control over the gas-turbine load is effected essentially by the adaptation of the fuel quantity in the second stage 2. The controllable compressor 18 ensures that, at zero load, the temperature does not fall below the minimum combustion temperature described above at the outlet of the catalyzer 3.

Figure 2:
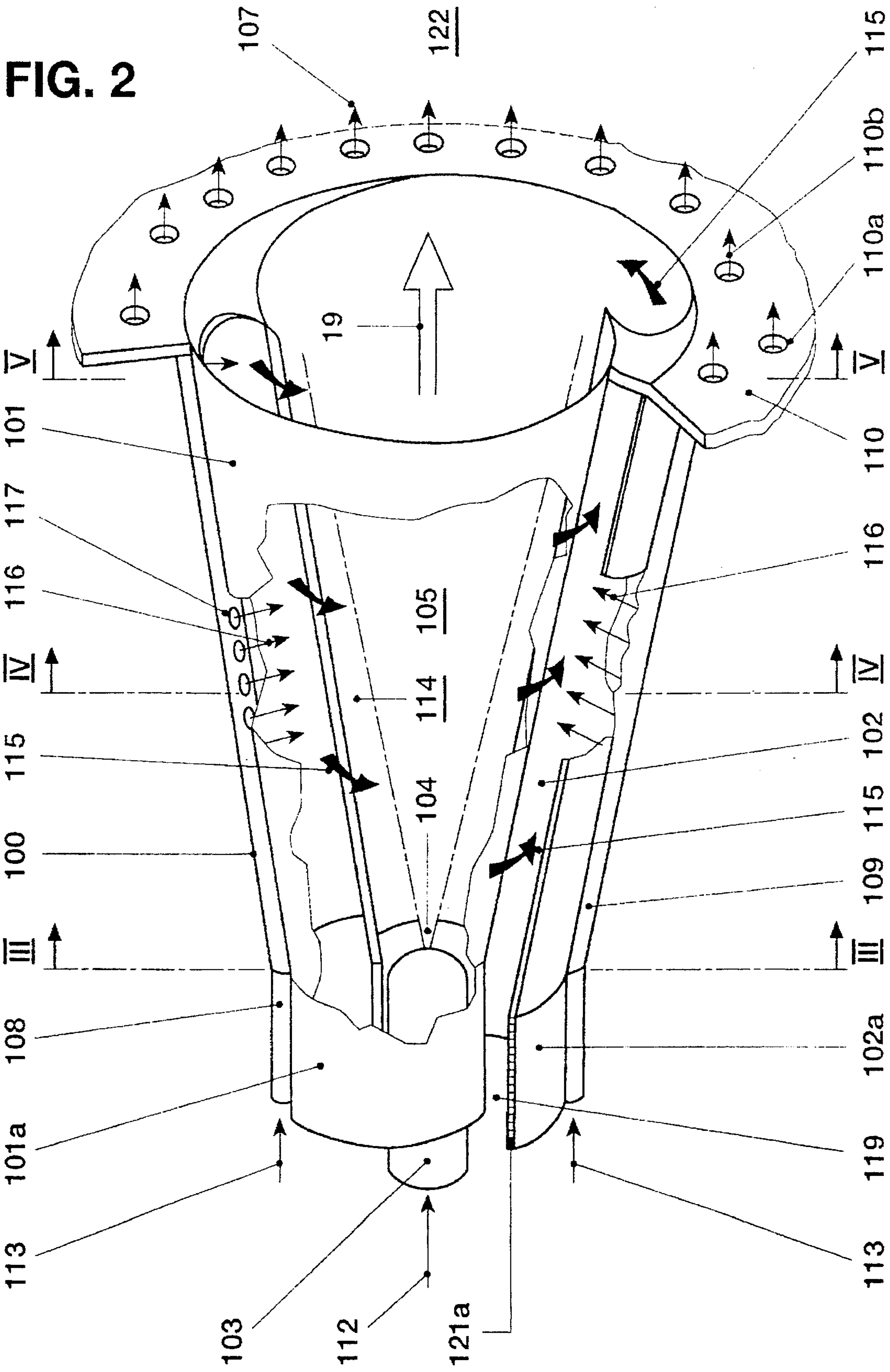
FIG. 2 shows a mixer in perspective representation, in appropriate cut-away section.
Figure 3:
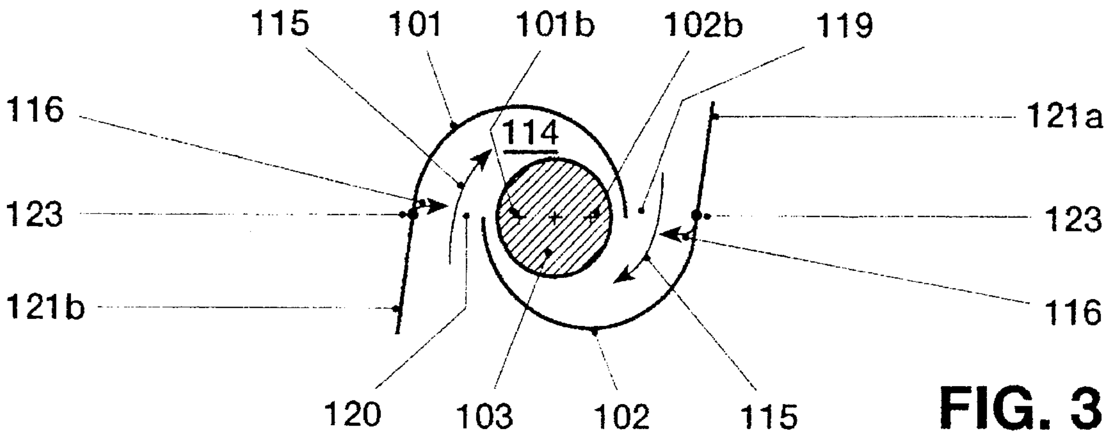
FIGS. 3–5 show corresponding sections through various planes of the mixer.
Figure 4:
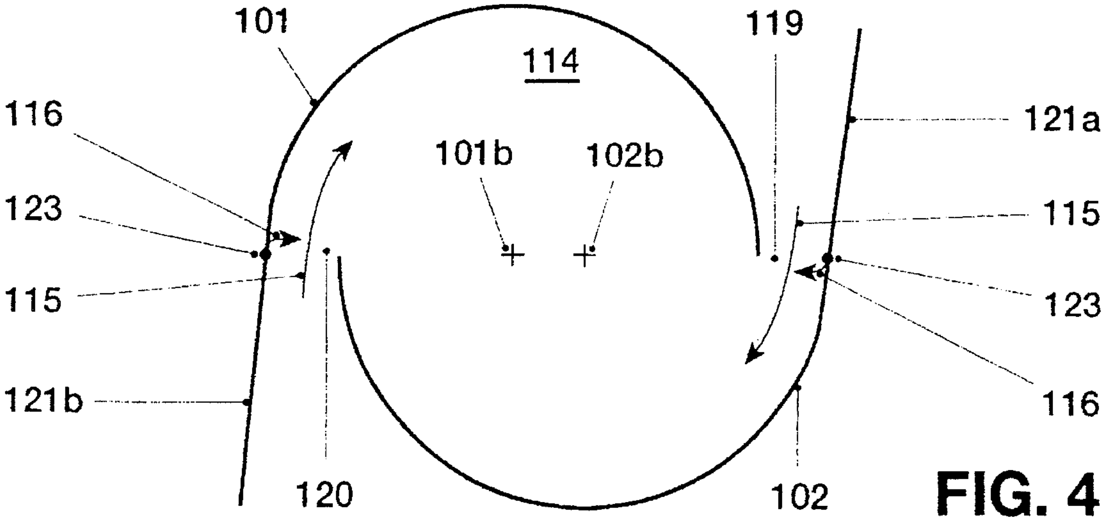
Figure 5:
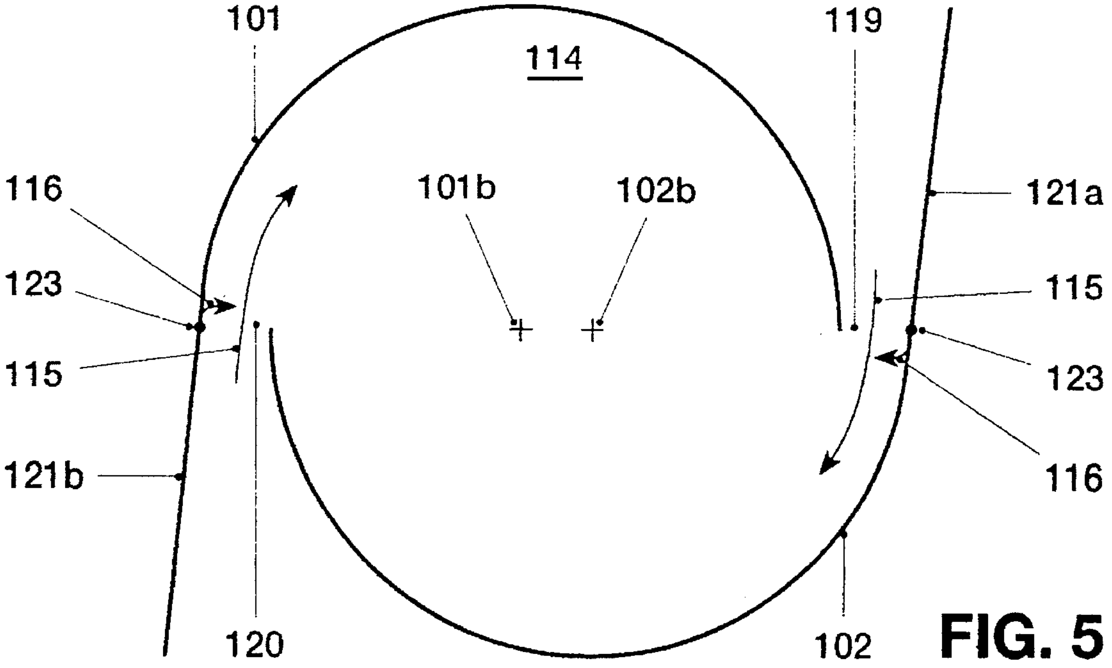

In order to better understand the construction of the mixer 100, it is of advantage if the individual sections according to FIGS. 3–5 are used at the same time as FIG. 2. Furthermore, so that FIG. 2 is not made unnecessarily complex, the baffle plates 121*a*, 121*b* shown schematically according to FIGS. 3–5 are only alluded to in FIG. 2. In the description of FIG. 2, the remaining FIGS. 3–5 are referred to below when required.

Figure 17:
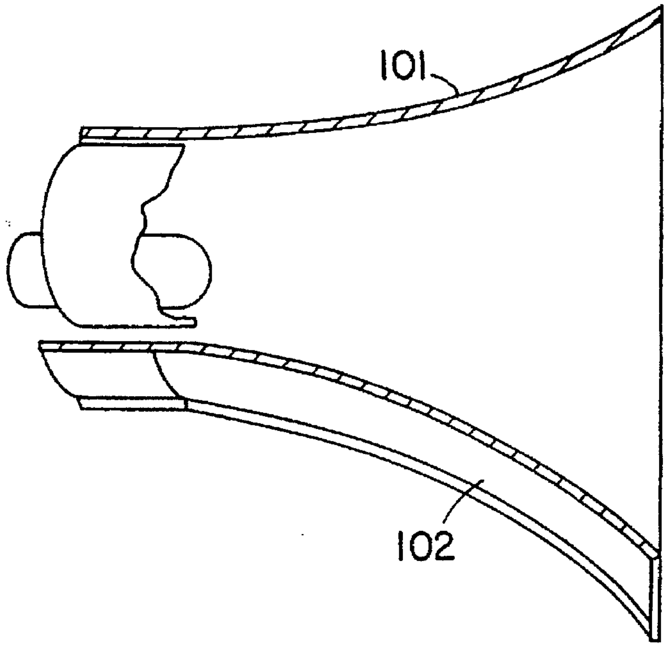
FIGS. 17–18 show alternative shapes for mixer bodies.
Figure 18:
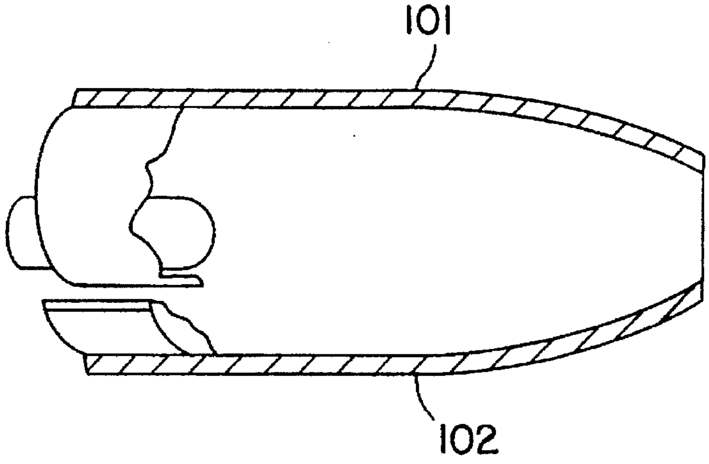

The mixer 100 according to FIG. 2 comprises two hollow conical sectional bodies 101, 102 which are nested one inside the other in a mutually offset manner. The mutual offset of the respective center axis or longitudinal symmetry axis 101*b*, 102*b* of the conical sectional bodies 101, 102 provides on both sides, in mirror-image arrangement, one tangential air-inlet slot 119, 120 each (FIGS. 3–5), through which the combustion air 115 flows into the interior space of the mixer 100, i.e. into the conical hollow space 114. The conical shape of the sectional bodies 101, 102 shown has a certain fixed angle in the direction of flow. Of course, depending on the operational use, the sectional bodies 101, 102 can have be shaped with a continually increasing or decreasing cone angle in the direction of flow, similar to a trumpet or tulip as shown in FIG. 17 and FIG. 18, respectively. The two conical sectional bodies 101, 102 each have a cylindrical initial part 101*a*, 102*a*, which parts likewise run offset from one another in a manner analogous to the conical sectional bodies 101, 102, so that the tangential air-inlet slots 119, 120 are present over the entire length of the mixer 100. Accommodated in the area of the cylindrical initial part is a nozzle 103, the injection 104 of which coincides approximately with the narrowest cross section of the conical hollow space 114 formed by the conical sectional bodies 101, 102. The injection capacity of this nozzle 103 and its type depend on the predetermined parameters of the respective mixer 100. It is of course possible for the mixer 100 to be of a purely conical design, that is without cylindrical initial parts 101*a*, 102*a*. Furthermore, the conical sectional bodies 101, 102 each have a fuel line 108, 109, which lines are arranged along the tangential inlet .slots 119, 120 and are provided with injection openings 117, through which preferably a gaseous fuel 113 is injected into the combustion air 115 flowing through there, as the arrows 116 are intended to symbolize. These fuel lines 108, 109 are preferably positioned at the latest at the end of the tangential inflow, before entering the conical hollow space 114, in order to obtain optimum air/fuel mixing. In the region of the transition piece 122, the outlet opening of the mixer 100 merges into a front wall 110 in which there are a number of bores 110*a*. The latter come into operation when required and ensure that diluent air or cooling air 110*b* is supplied to the front part of the transition piece 122. The fuel fed through the nozzle 103 is a liquid fuel 112, which if need be can be enriched with a recycled exhaust gas. This fuel 112 is injected at an acute angle into the conical hollow space 114. Thus a conical fuel profile 105 forms from the nozzle 103, which fuel profile 105 is enclosed by the rotating combustion air 115 flowing in tangentially. The concentration of the fuel 112 is continuously reduced in the axial direction by the inflowing combustion air 115 to form an optimum mixture. If the mixer 100 is operated with a gaseous fuel 113, this preferably takes place via opening nozzles 117, the forming of this fuel/air mixture being achieved directly at the end of the air-inlet slots 119, 120. When the fuel 112 is injected via the fuel nozzle 103, the optimum, homogeneous fuel concentration over the cross section is achieved at the end of the mixer 100. If the combustion air 115 is additionally preheated or enriched with a recycled exhaust gas, this provides lasting assistance for the evaporation of the liquid fuel 112. The same considerations also apply if liquid fuels are supplied via the lines 108, 109 instead of gaseous fuels. Narrow limits per se are to be adhered to in the configuration of the conical sectional bodies 101, 102 with regard to conical angle and width of the tangential air-inlet slots 119, 120 so that the desired flow field of the combustion air 115 can arise at the outlet of the mixer 100. In general it may be said that minimizing of the cross section of the tangential air-inlet slots 119, 120 is predestined to form a backflow zone 106. But in our case a backflow zone especially is not to be formed, for which reason the aerodynamics of the mixer 100 must be such that the swirl can be substantially reduced. This is done by 20–100% wider air-inlet slots 119, 120 compared with an identical body which serves as a premixing burner. Another way of preventing the formation of a backflow zone consists in increasing the number of air-inlet slots, the number of sectional bodies also increasing accordingly at the same time. The axial velocity inside the mixer 100 can be changed by a corresponding supply (not shown) of an axial combustion-air flow. Furthermore, the construction of the mixer 100 is excellently suitable for changing the size of the tangential air-inlet slots 119, 120, whereby a relatively large operational range can be covered without changing the overall length of the mixer 100. The sectional bodies 101, 102 can of course also be displaced relative to one another in another plane, as a result of which even an overlap of the same can be activated. It is even possible to nest the sectional bodies 101, 102 spiral-like one inside the other by a contra-rotating movement.

The geometric configuration of the baffle plates 121*a*, 121*b* is now apparent from FIGS. 3–5. They have a flow-initiating function, extending, in accordance with their length, the respective end of the conical sectional bodies 101, 102 in the oncoming-flow direction relative to the combustion air 115. The ducting of the combustion air 115 into the conical hollow space 114 can be optimized by opening or closing the baffle plates 121*a*, 121*b* about a pivot 123 placed into the conical hollow space 114 in the area of the entry of this duct, and this is especially necessary if the original gap size of the tangential air-inlet slots 119, 120 is to be changed for the abovementioned reasons. These dynamic measures can of course also be provided statically by makeshift baffle plates forming a fixed integral part with the conical sectional bodies 101, 102. The mixer 100 can likewise also be operated without baffle plates or other aids can be provided for this.

Figure 6:
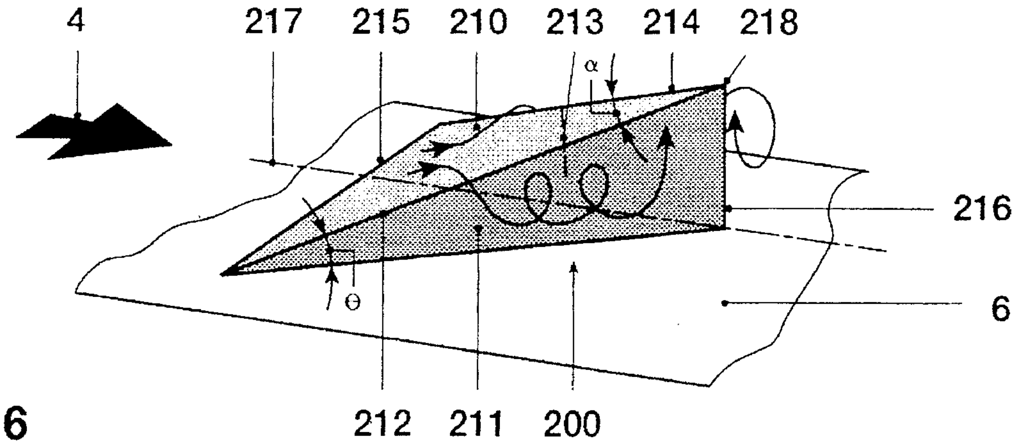
FIG. 6 shows a perspective representation of the vortex generator.
Figure 7:
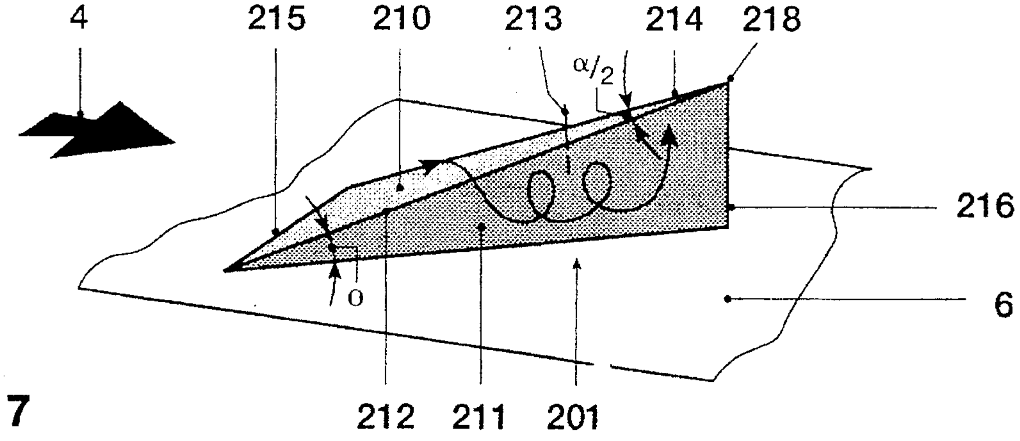
FIG. 7 shows an embodiment variant of the vortex generator.
Figure 8:
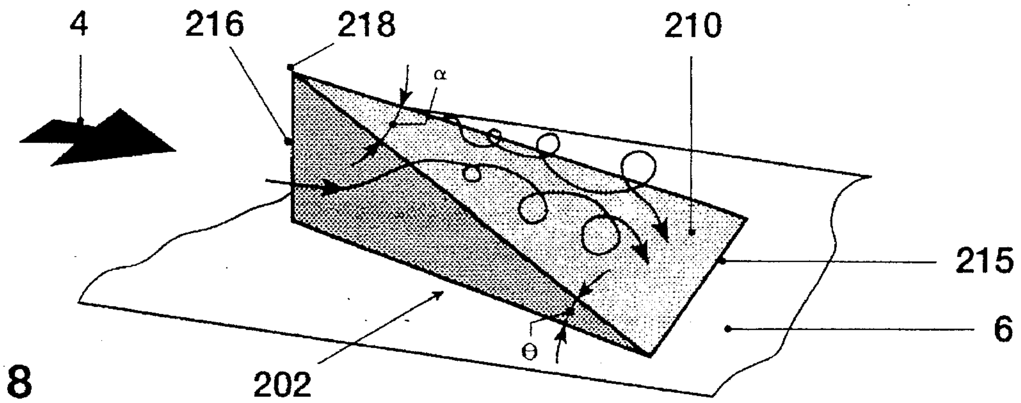
FIG. 8 shows an arrangement variant of the vortex generator according to FIG. 7.

The actual inflow zone 5 is not shown in FIGS. 6, 7 and 8. However, the flow of the hot gases 4 is shown by an arrow, whereby the direction of flow is also predetermined. According to these figures, a vortex generator 200, 201, 202 essentially comprises three triangular surfaces around which flow occurs. These are a top surface 210 and two side surfaces 211 and 213. In their longitudinal extent, these surfaces run at certain angles in the direction of flow. The side walls of the vortex generators 200, 201, 202, which preferably consist of right-angled triangles, are fixed, preferably gastight, with their longitudinal sides to the duct wall 6 already discussed. They are orientated in such a way that they form a face at their narrow sides while enclosing an acute or arrow angle $\alpha$. The face is embodied as a sharp connecting edge 216 and is perpendicular to every duct wall 6 with which the side surfaces are flush. The two side surfaces 211, 213 enclosing the arrow angle $\alpha$ are symmetrical in form, size and orientation in FIG. 4 and they are arranged on both sides of a symmetry axis 217 which is equidirectional to the duct axis.

With a very narrow edge 215 running transversely to the duct through which flow occurs, the top surface 210 bears against the same duct wall 6 as the side surfaces 211, 213. Its longitudinally directed edges 212, 214 are flush with the longitudinally directed edges of the side surfaces 211, 213 projecting into the flow duct. The top surface 210 runs at a setting angle $\theta$ to the duct wall 6, the longitudinal edges 212, 214 of which form a point 218 together with the connecting edge 216. The vortex generator 200, 201, 202 can of course also be provided with a base surface with which it is fastened to the duct wall 6 in a suitable manner. However, such a base surface is in no way connected with the mode of operation of the element.

The mode of operation of the vortex generator 200, 201, 202 is as follows: when flow occurs around the edges 212 and 214, the main flow is converted into a pair of oppositely directed vortices, as shown schematically in the figures. The vortex axes lie in the axis of the main flow. The swirl number and the location of the vortex breakdown, provided the latter is intended, are determined by corresponding selection of the setting angle θ and the arrow angle α. The vortex intensity and the swirl number increase as the angles increase, and the location of the swirl breakdown is displaced upstream right into the region of the vortex generator 200, 201, 202 itself. Depending on the use, these two angles θ and α are predetermined by design conditions and by the process itself. These vortex generators need only be adapted in respect of length and height, as will be dealt with in detail further below with reference to FIG. 9.

In FIG. 6, the connecting edge 216 of the two side surfaces 211, 213 forms the downstream edge of the vortex generator 200. The edge 215 of the top surface 210 running transversely to the duct through which flow occurs is therefore the edge acted upon first by the duct flow.

FIG. 7 shows a so-called half "vortex generator" on the basis of a vortex generator according to FIG. 6. In the vortex generator 201 shown here, only one of the two side surfaces is provided with the arrow angle α/2. The other side surface is straight and is aligned in the direction of flow. In contrast to the symmetrical vortex generator, only one vortex is produced here on the side having the arrow, as symbolized in the figure. Accordingly, there is no vortex neutral field downstream of this vortex generator; on the contrary, a swirl is imposed on the flow.

FIG. 8 differs from FIG. 6 in as much as the sharp connecting edge 216 of the vortex generator 202 is here that point which is acted upon first by the duct flow. The element is accordingly turned through 180°. As apparent from the representation, the two oppositely directed vortices have changed their direction of rotation.

Figure 9:
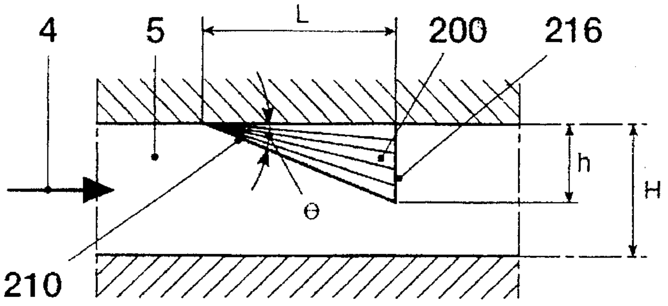
FIG. 9 shows a vortex generator in the premixing duct.

FIG. 9 shows the basic geometry of a vortex generator 200 installed in a duct 5. As a rule, the height h of the connecting edge 216 will be coordinated with the height H of the duct or the height of the duct part which is allocated to the vortex generator in such a way that the vortex produced already achieves such a size directly downstream of the vortex generator 200 that the full height H of the duct is filled by it. This leads to a uniform velocity distribution in the cross section acted upon. A further criterion which can bring an influence to bear on the ratio of the two heights h/H to be selected is the pressure drop which occurs when the flow passes around the vortex generator 200. It will be understood that the pressure-loss factor also increases at a greater ratio of h/H.

The vortex generators 200, 201, 202 are mainly used where it is a matter of mixing two flows with one another. The main flow 4 attacks as hot gases the transversely directed edge 215 or the connecting edge 216 in the arrow direction. The secondary flow in the form of a gaseous and/or liquid fuel, which if need be is enriched with a portion of assisting air (cf. FIG. 1), has a substantially smaller mass flow than the main flow. In the present case, this secondary flow is directed downstream of the vortex generator into the main flow, as is particularly apparent from FIG. 1.

In the example shown according to FIG. 1, four vortex generators 200 are distributed at a distance apart over the periphery of the duct 5. The vortex generators can of course also be joined in sequence in the peripheral direction in such a way that no clear gaps are left in the duct wall 6. The vortex to be produced is ultimately decisive for the selection of the number and the arrangement of the vortex generators.

FIGS. 10–16 show further possible forms of the introduction of the fuel into the hot gases 4. These variants can be combined with one another and with central fuel injection in a variety of ways, as apparent, for example, from FIG. 1.

In FIG. 10, the fuel, in addition to being injected via duct-wall bores 220 which are located downstream of the vortex generators, are also injected via wall bores 221 which are located directly next to the side surfaces 211, 213 and in their longitudinal extent in the same duct wall 6 on which the vortex generators are arranged. The introduction of the fuel through the wall bores 221 gives the vortices produced an additional impulse, which prolongs the life of the vortex generator.

In FIGS. 11 and 12, the fuel is injected via a slot 222 or via wall bores 223, both arrangements being made directly in front of the edge 215 of the top surface 210 running transversely to the duct through which flow occurs and in their longitudinal extent in the same duct wall 6 on which the vortex generators are arranged. The geometry of the wall bores 223 or of the slot 222 is selected in such a way that the fuel is fed at a certain injection angle into the main flow 4 and, as a protective film, largely screens the subsequently placed vortex generator from the hot main flow 4 by flowing around the vortex generator.

In the examples described below, the secondary flow (cf. above) is first of all directed via guides (not shown) through the duct wall 6 into the hollow interior of the vortex generators. An internal cooling means for the vortex generators is thus provided without having to provide further measures.

In FIG. 13, the fuel is injected via wall bores 224 which are located inside the top surface 210 directly behind and along the edge 215 running transversely to the duct through which flow occurs. The cooling of the vortex generator is effected here externally rather than internally. The issuing secondary flow, when flowing around the top surface 210, forms a protective layer screening the latter from the hot main flow 4.

In FIG. 14, the fuel is injected via wall bores 225 which are arranged in an echelon inside the top surface 210 along the symmetry line 217. With this variant, the duct walls 6 are protected especially effectively from the hot main flow 4, since the fuel is introduced first of all at the outer periphery of the vortices.

In FIG. 15, the fuel is injected via wall bores 226 which are located in the longitudinally directed edges 212, 214 of the top surface 210. This solution guarantees effective cooling of the vortex generators, since the fuel issues at its extremities and thus passes completely around the inner walls of the element. The secondary flow is fed here directly into the developing vortex, which leads to defined flow relationships.

In FIG. 16, the fuel is injected via wall bores 227 which are located in the side surfaces 211 and 213, on the one hand in the region of the longitudinal edges 212 and 214, and on the other hand in the region of the connecting edge 216. This variant has a similar action to that in FIG. 10 (bores 221) and in FIG. 15 (bores 226).

What is claimed as new and desired to be secured by letters patent of the United States is:

1. A combustion chamber for a gas turbine apparatus, which comprises a wall enclosing a duct having a longitudinal flow direction along a duct axis, the combustion chamber being divided into a:

a first stage having a mixer mounted on a head side for forming a fuel/air mixture, a catalyzer downstream of the mixer for combustion of the fuel/air mixture, a plurality of vortex generators mounted on an interior wall segment downstream of the catalyzer, and a venturi-shaped duct section downstream of the vortex generators and means for injecting at least one of a gaseous and liquid fuel into the venturi-shaped duct section, and a second stage immediately downstream of the venturi-shaped duct section, the wall being shaped to form an expanding jump in cross section.

2. The combustion chamber as claimed in claim 1, wherein each vortex generator has three surfaces around which flow occurs freely and which extend in the direction of flow, including a top surface and two side surfaces, wherein edges of the side surfaces are mounted flush on a wall segment of the duct, the side surfaces being joined at an acute arrow angle with one another, wherein the top surface has an edge running transversely to the duct flow direction which is mounted on the wall segment with the side surfaces, and wherein longitudinally directed edges of the top surface are joined flush with longitudinally directed edges of the side surfaces projecting into the duct, the top surface being oriented at a setting angle to the wall segment of the duct.

3. The combustion chamber as claimed in claim 2, wherein the two side surfaces, of the vortex generator are arranged symmetrically about a symmetry axis parallel to the duct axis.

4. The combustion chamber as claimed in claim 2, wherein the two side surfaces are joined at a connecting edge which together with the longitudinally directed edges of the top surface form a point, and wherein the connecting edge lies in a radial line of the duct.

5. The combustion chamber as claimed in claim 4, wherein the connecting edge and the longitudinally directed edges of the top surface joined to the longitudinally directed edges of the side surfaces form sharp corners.

6. The combustion chamber as claimed in claim 4, wherein the symmetry axis of each vortex generator runs parallel to the duct axis, wherein the each vortex generator is oriented so that the connecting edge of the two side surfaces forms the downstream edge of the vortex generator and the edge of the top surface running transversely to the flow direction of the duct is the edge acted upon first by the main flow.

7. The combustion chamber as claimed in claim 4, wherein a ratio of a height of the vortex generator measured on the connecting edge to a height of the duct is selected so that a vortex produced fills the height of the duct and the height of the duct part in which the vortex generator is mounted and directly downstream of the vortex generator.

8. The combustion chamber as claimed in claim 1, wherein the mixer comprises at least two hollow, conical sectional bodies which are mounted adjacent one another to define a conical interior space oriented in a direction of flow, respective longitudinal symmetry axes being offset from one another so that adjacent edges of the sectional bodies are spaced apart to form longitudinally extending ducts for a tangential combustion-air flow into the interior space, and wherein there is at least one fuel nozzle in the conical interior space.

9. The combustion chamber as claimed in claim 8, wherein additional fuel nozzles are mounted at the tangential ducts along the longitudinal extent.

10. The combustion chamber as claimed in claim 8, wherein, the sectional bodies have a cone angle that is fixed in the direction of flow.

11. The combustion chamber as claimed in claim 8, wherein the sectional bodies are nested spiral-like one inside the other.

12. The combustion chamber as claimed in claim 1, wherein the combustion chamber is an annular combustion chamber.

13. The combustion chamber as claimed in claim 1, wherein the means for injecting at least one of a gaseous and liquid fuel includes means for injecting assisting air, and wherein the injecting means is at least one fuel nozzle positioned to inject fuel and air directed at least one of parallel to and transversely to the main flow in a minimum diameter location in the venturi-shaped duct.

14. The combustion chamber as claimed in claim 8, wherein the sectional bodies are shaped with a cone angle that continuously increases in the direction of flow.

15. The combustion chamber as claimed in claim 8, wherein the sectional bodies are shaped with a cone angle that continuously decreases in the direction of flow.

* * * * *